June 27, 1950 — M. W. GIESKIENG — 2,512,894
GENEVA MOVEMENT FOR MOTION-PICTURE PROJECTORS
Filed Nov. 12, 1946 — 2 Sheets-Sheet 1
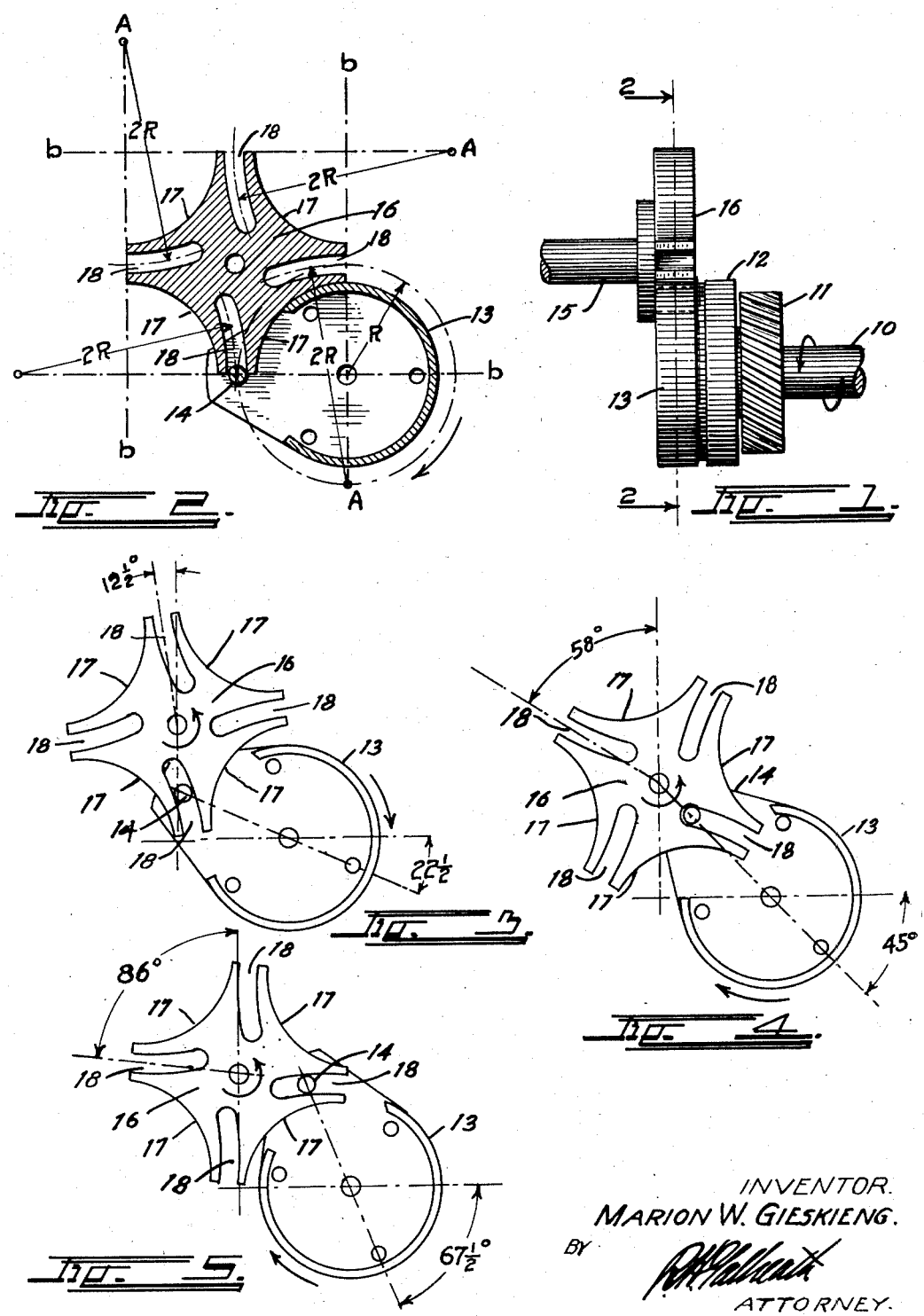
INVENTOR.
MARION W. GIESKIENG.
BY
ATTORNEY.

INVENTOR.
MARION W. GIESKIENG.
BY
ATTORNEY.

Patented June 27, 1950

2,512,894

UNITED STATES PATENT OFFICE 2,512,894

GENEVA MOVEMENT FOR MOTION-PICTURE PROJECTORS

Marion W. Gieskieng, Denver, Colo.

Application November 12, 1946, Serial No. 709,118

1 Claim. (Cl. 74—436)

This invention relates to a Geneva movement for motion picture projectors. The orthodox Geneva movement, as used in motion picture equipment, contains a star wheel and a cam which carries a cam pin. The star wheel is provided with four straight, diametrically extending cam pin slots. Such a Geneva movement creates a uniform graph curve in which the acceleration and deceleration of the star wheel are exactly equal, both being comparatively rapid. This rapid deceleration of the movement of the film in a camera or projector has a tendency to cause the film, due to its inertia, to override the proper framing position. To overcome this tendency, excessive frictional braking must be applied to the film to bring it to rest rapidly and prevent overriding. The conventional motion picture film feeds through the projector at 90 feet per minute, and at the peak of star wheel movement, it is traveling at the rate of 850 feet per minute. The frictional braking required for the short deceleration period of the conventional movement is so excessive that it creates great resistance to the acceleration of the film to result in excessive film wear and damage.

The principal object of this invention is to provide an improved Geneva movement which will give a more gradual deceleration to the star wheel than the orthodox movement so that the film may be brought to rest with a minimum of frictional braking. In thus relieving the braking friction on the film, the damage due to rapid acceleration will be eliminated, or at least greatly reduced. No great amount of stress is involved in accelerating the film from a stationary position and bringing it to its maximum velocity, for the film itself is very light-weight and free-flowing unless braking or frictional resistance is applied thereto. Therefore, since this invention reduces the necessity for braking friction by increasing the deceleration period, wear and damage to the film will be reduced to the minimum.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawings:

Fig. 1 is a fragmentary side elevation of the type of Geneva movement employed in the conventional motion picture projector;

Fig. 2 is a vertical section therethrough, taken on the line 2—2, Fig. 1, in which the various center points are indicated by intersecting location lines;

Figure 6:
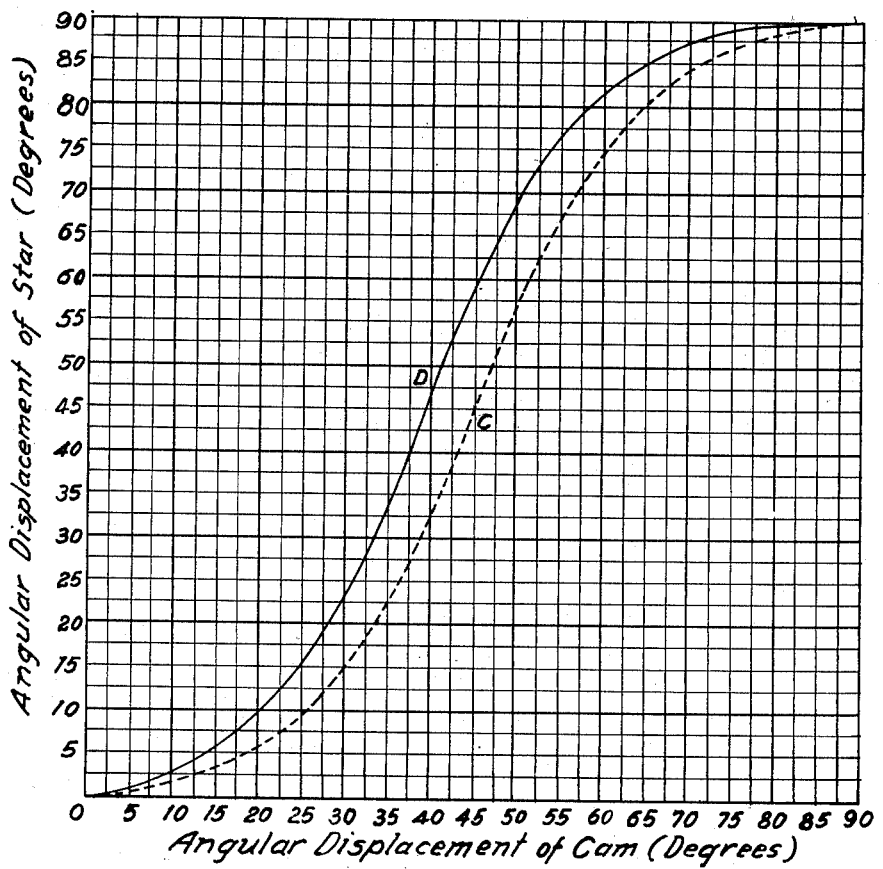
Figure 7:
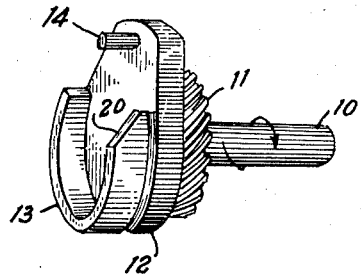
Figure 8:
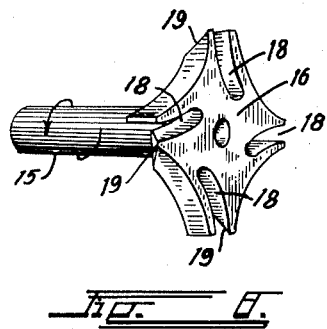

Figs. 3, 4, and 5 are position diagrams, indicating three given positions of the movement;

Fig. 6 is a graph chart illustrating the acceleration and deceleration curve of the conventional Geneva gear in broken line, and the corresponding curve of the improved Geneva gear in solid line;

Fig. 7 is a detail perspective view, illustrating a type of cam which may be used with the improved movement; and Fig. 8 is a similar view, illustrating a type of star wheel which is used with the cam of Fig. 7.

In Figs. 1 and 2, elements of a conventional Geneva movement, as used in motion picture projectors, are designated by numeral as follows: cam shaft 10; cam drive gear 11; cam plate 12; cam 13; cam pin 14; star wheel shaft 15; and star wheel 16.

The improved movement operates in the conventional manner, that is, the cam shaft 10 rotates continuously and the circumference of the cam successively enters four arcuate depressions 17 formed in the star wheel 16. During 90° of each revolution of the cam shaft 10 the pin 14 will enter and travel in receiving slots 18 formed in the star wheel, thus rotating the star wheel one-fourth of a revolution or 90° during each complete revolution of the cam shaft 10.

In the conventional Geneva movement the pin-receiving slots in the star wheel are straight and lie on radial lines from the axis of the star wheel shaft 15. In the improved Geneva movement, however, the pin-receiving slots 18 are curvated in a direction to approach concentricity with the circumference of the cam 13. The arc of the slots 18 changes the relative time intervals of acceleration and deceleration of the star wheel. The greater the curvature, or the shorter the radius of the arc, the greater will be the acceleration and the more gradual the deceleration.

It has been found by experiment that the most satisfactory radius for the arc of the slots 18 is twice the radius R of the circle described by the pin 14, as indicated by the center points A in Fig. 2. The center points A are positioned on center lines which will intersect the axis of the cam shaft 10 and cut the points of entrance and exit of the pin 14 from the slots 18 when the star wheel is at rest, as indicated by the center lines A—b in Fig. 2.

With the center points for the radii of the slots 18 being positioned on the lines A—b, and with radii of twice the diameter of the cycle traveled by the pin 14 (2R), substantially the following results are obtained: a 22½° rotation of the cam wheel from the point of entrance of the pin 14, as shown in Fig. 3, will rotate the star wheel 12½°. In other words, the star wheel is at that instant traveling at approximately one-half the speed of the cam. A further rotation of the cam 22½°, or a total of 45°, as shown in Fig. 4, will rotate the star wheel 58°, as compared with the 45° of the conventional Geneva movement. Thus the acceleration has been increased.

An additional 22½° rotation of the cam, or a total of 67½°, as shown in Fig. 5, rotates the star wheel 86°, as compared with the 82½° rotation of the conventional, straight-slotted star wheel.

It can be seen from this that a greater period of time is taken for decelerating the speed of the star wheel than is taken for accelerating the speed thereof. This is indicated graphically in the chart of Fig. 6, in which the curve C indicates the curve of the conventional Geneva movement, and the curve D indicates the curve of the improved Geneva movement.

It will be noted that the star wheel and the film in the projector will be brought to rest much more gradually than with the conventional movement. At 65° rotation of the cam the improved movement has cut the deceleration curve of the old movement in half. Therefore, only one-half the usual frictional braking is required upon the film to prevent it from overrunning or overshooting its proper framing position, with the resulting jumping of the projected picture.

Since less frictional braking is required on the film, it will have much less resistance to acceleration at the beginning of its movement. The reduction of this resistance greatly reduces the starting strain and resulting wear and tear upon the film.

The relative degrees of movement of the improved Geneva gear and the conventional Geneva gear, as given herein, have been determined from measurements of an actual working model. They have not been determined mathematically. There may be, therefore, a slight variation either way, due to errors in measurement and in construction.

The star wheel in the improved movement comes out of the cam at a much slower rate than the conventional Geneva movement, depending upon the radius of the arc of the pin slots. Due to this the trailing extremity of the cam approaches exceedingly close to the forward side of the pin slot in the star wheel. With a radius of 2R and a 90° cam opening there is just sufficient clearance for the two parts to pass each other. With a radius of less than 2R, however, the conventional 90° cam opening would not clear the exiting star wheel. The cam opening cannot be increased, as this would tend to inaccuracy in the alignment of the pin slot with the incoming pin.

Therefore, for shorter radius slots, means must be provided for preventing interference at this point. This is accomplished by inclining the ends of the forward sides of the slots 18 at an angle of approximately 45°, as indicated at 19 in Fig. 8, and by correspondingly inclining the trailing end of the cam 13, as indicated at 20 in Fig. 7. This, in effect, widens the gap in the cam, for until the two inclines 19 and 20 align with each other, the star wheel may rotate outwardly. It does not interfere with the accuracy of the cam surface in holding the star wheel through 270° of rotation of the cam, since the length of the long side of the cam surface and the length of the arcuate depressions 17 remain the same.

It is desired to call attention to the fact that the pin 14 enters and exits from the slots 18 tangentially, since the circumference of the circle traveled by the pin 14 and the circumference of the arc of the slots 18 coincide at the point of entrance and exit. Therefore, there is no movement of the star wheel at the instant of entering or leaving the slots.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A Geneva movement comprising a rotatable cylindrical cam having an end plate and an arcuate circumferentially extending marginal wall having its ends spaced from each other 90°, said end plate having an extension projecting from the open side of the marginal wall radially of the end plate and adjacent its outer and carrying a laterally projecting pin parallel to the axis of the end plate, a star wheel rotatable about an axis parallel to the axis of the cam and having its periphery formed with four arcuate recesses having their ends spaced from each other equal distances circumferentially thereof, the arcuate wall of the cam successively lying in said recesses and in close fitting face to face engagement with arcuate edges of the recesses, and said star wheel being formed with four longitudinally arcuate slots extending from portions of its periphery between spaced ends of the recesses, outer ends of oppositely disposed ones of said slots having their outer ends disposed in offset relation to a diameter of the star wheel and their inner portions crossing the said diameter, and each slot constituting an arc of a circle having a radius twice the radius of the circle followed by said pin during rotation of the cam and movement of the pin into and out of successive slots to impart intermittent rotation to the star wheel.

MARION W. GIESKIENG.

REFERENCES CITED

The following references are of record in the file of this patent:

UNITED STATES PATENTS

| Number | Name | Date |
| --- | --- | --- |
| 1,361,168 | Morton | Dec. 7, 1920 |
| 2,057,686 | Lake et al. | Oct. 20, 1936 |

FOREIGN PATENTS

| Number | Country | Date |
| --- | --- | --- |
| 299,343 | Germany | Dec. 30, 1915 |
| 461,078 | Great Britain | Feb. 9, 1937 |